(12) United States Patent
Vitoorapakorn

(10) Patent No.: US 6,692,054 B2
(45) Date of Patent: Feb. 17, 2004

(54) PICKUP BED LINER

(75) Inventor: Pawat Vitoorapakorn, Changwad Samutprakarr (TH)

(73) Assignee: Aeroflex International Co., Ltd., Changwad (TH)

(*) Notice: Subject to any disclaimer, the term of this patent is extended or adjusted under 35 U.S.C. 154(b) by 0 days.

(21) Appl. No.: 09/998,730

(22) Filed: Nov. 30, 2001

(65) Prior Publication Data

US 2003/0052503 A1 Mar. 20, 2003

(30) Foreign Application Priority Data

Sep. 17, 2001 (TH) .................................. 0103000526

(51) Int. Cl.⁷ ............................................... B60R 13/01
(52) U.S. Cl. ..................................................... 296/39.2
(58) Field of Search .............................. 296/39.1, 39.2

(56) References Cited

U.S. PATENT DOCUMENTS

| 4,752,097 A | * | 6/1988 | Van Kirk et al. | 296/39.2 |
| 4,872,720 A | * | 10/1989 | Nagy | 296/39.1 |
| 5,007,671 A | * | 4/1991 | Oprea | 296/39.2 |
| 5,370,436 A | * | 12/1994 | Martindale | 296/39.2 |
| 5,755,481 A | * | 5/1998 | Emery | 296/39.1 |

* cited by examiner

*Primary Examiner*—Dennis H. Pedder
(74) *Attorney, Agent, or Firm*—Volpe and Koenig, P.C.

(57) ABSTRACT

A pickup bed liner having a base panel, a pair of opposed side walls, the liner being adapted to be received in the interior of a pickup bed, the side walls having an upper edge receivable between the outer panel of the pickup bed and an inner lip extending from an upper rim of the outer side wall of the pickup bed.

3 Claims, 10 Drawing Sheets

Fig. 5
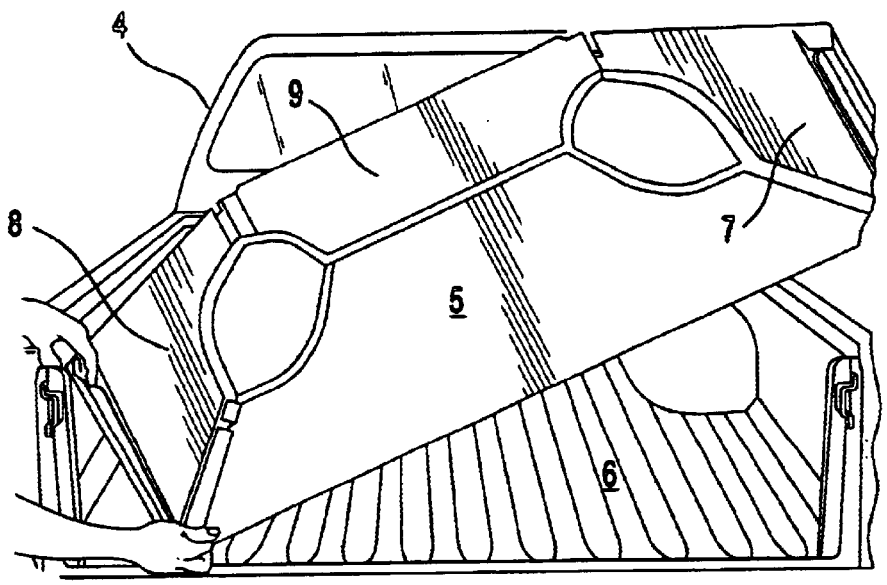
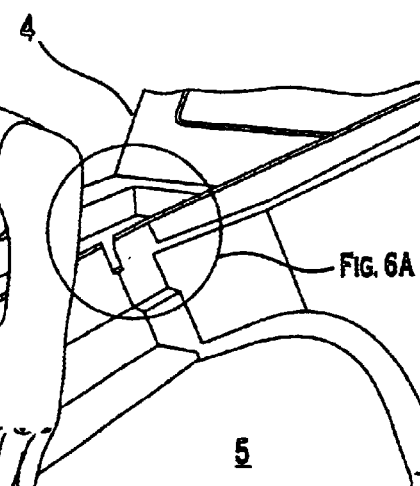
Fig. 6
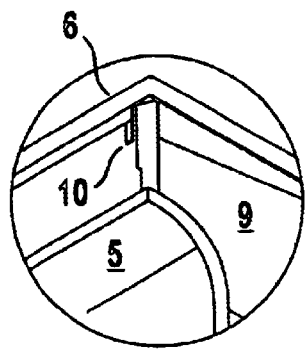
Fig. 6A

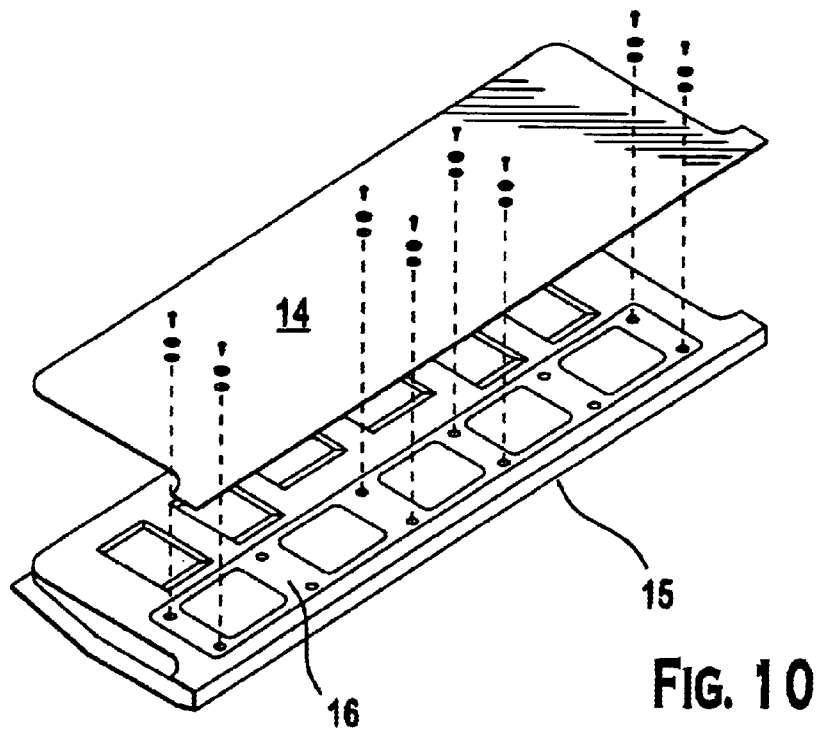
FIG. 10
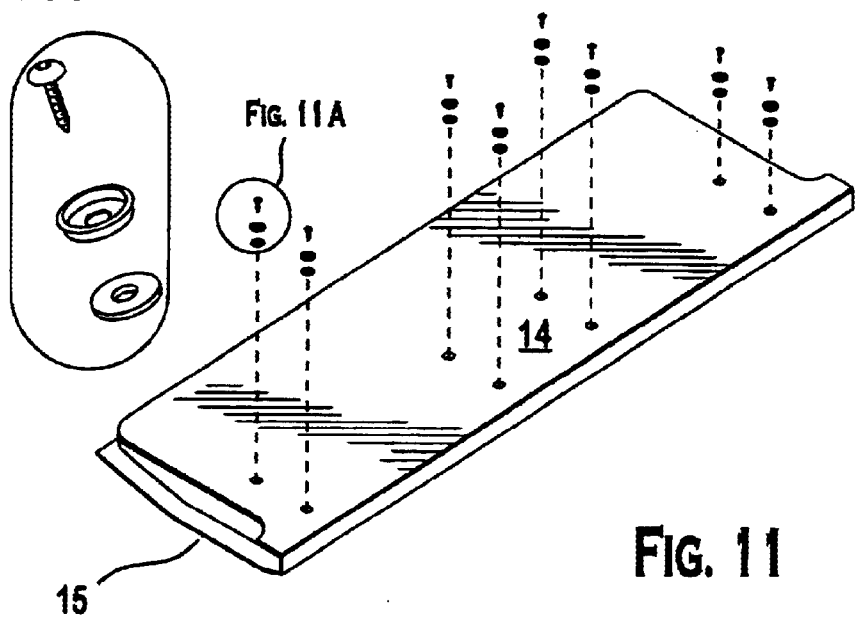
FIG. 11A
FIG. 11

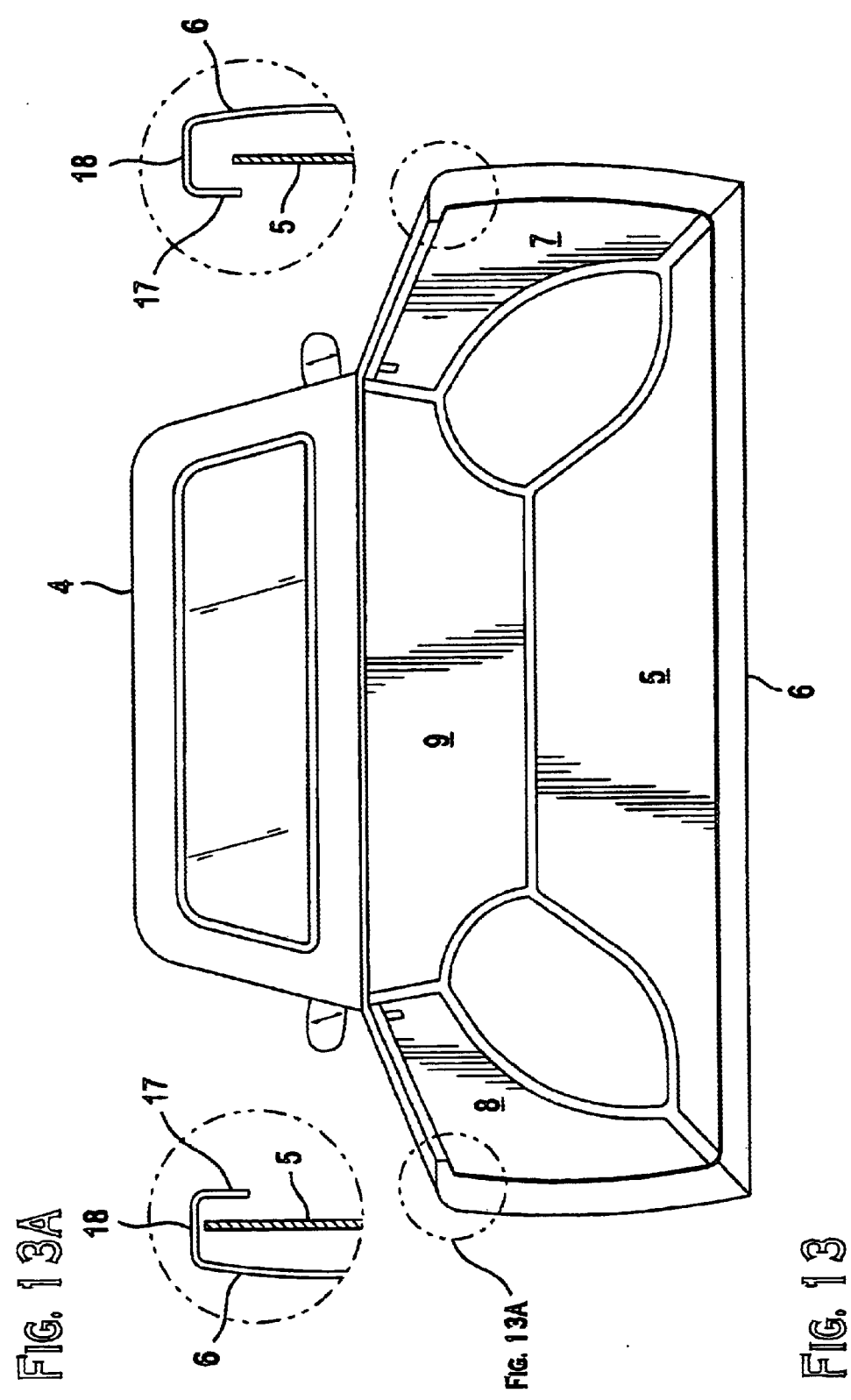

PICKUP BED LINER

CROSS REFERENCE TO RELATED APPLICATIONS

This application claims priority from Thai Patent Application No. 0103000526, filed Sep. 17, 2001.

FIELD OF THE INVENTION

The present invention relates to a motor vehicle generally known as a pickup or utility having a walled area at the rear for the transport of a cargo. More particularly it relates to a protective liner for the cargo area of the pickup. Within this specification, the cargo area of the pickup is referred to as the pickup bed and the protective liner is referred to as the pickup bed liner.

BACKGROUND ART

The pickup bed liner is generally used to protect the pickup bed from damage or scratching to the pickup bed due to the placement or movement of cargo within the pickup bed. A variety of types of pickup bed liner exist in the market.

One type of pick bed liner is provided with an envelope edge which overlies the upper rim of the pickup bed and is secured by screws inserted through the liner into holes drilled in the pickup bed or the rim thereof. While this manner of securing the liner provides a strong installation, certain problems result. In particular, the holes drilled in the pickup bed are points at which the rusting of the pickup bed may commence and such rusting is then able to propagate across the pickup bed. In addition, the heads of the screws securing the liner to the pickup bed along the rim of the pickup bed can obstruct the installation of a roof canopy over the pickup bed. In such installations, water from rain or the washing of the vehicle is able to leak into the covered pickup bed past the heads of the screws. It has been found that the use of sealant in such installations is ineffective because the sealant is not compatible with the material from which the liner is made.

Another type of pickup bed liner is provided with an upper edge similar to that of the liner referred to above which overlies the rim of the pickup bed. In this case, it is not necessary to drill holes in the pickup bed as the liner is secured by fixing apparatus in the form of clamps each operated by a screw which secures the liner to the pickup bed. The fixing apparatus comprises hooks or loops or any similar apparatus of the type designed to secure a cargo by ropes or belts. In this type of liner, the liner is provided with factory drilled holes positioned to coincide with inner edge of the pickup bed in order to insert clamping the apparatus. However, this type of liner also has a problem of water leakage past the junction between the roof canopy and the pickup bed.

DISCLOSURE OF THE INVENTION

Accordingly, the invention resides in a pickup bed liner having a base panel, a pair of opposed side walls, the liner being adapted to be received in the interior of a pickup bed, the side walls having an upper edge receivable between the outer panel of the pickup bed and an inner lip extending from an upper rim of the outer side wall of the pickup bed.

According to a preferred feature of the invention, the height of the upper edge of one side wall from the base panel is greater than height of the upper edge of the other side wall from the base panel.

According to a preferred feature of the invention, each upper edge is provided with one or more cut-outs to facilitate fixing of the upper edge to the inner lip, the depth of the cut-outs enabling the inner lip to be received in the cut-outs.

According to a preferred feature of the invention, the liner further comprises a tailgate liner adapted to be secured to the tailgate.

The invention will be more fully understood in the light of the following description of one specific embodiment.

BRIEF DESCRIPTION OF THE DRAWINGS

The description is made with reference to the accompanying drawings of which:

FIG. 5 is diagrammatic rear view of a pickup bed liner according to the embodiment during a first step of the installation to a pickup bed;

FIG. 6 is diagrammatic isometric view of a front left corner of a pickup bed liner during a second step of the installation to a pickup bed;

FIG. 6a is an enlargement of the corner of the rim of the pickup bed during the installation step illustrated in FIG. 6;

FIG. 10 is an exploded view of the tailgate as shown in FIG. 9 showing the position of the tailgate liner in accordance with the embodiment;

FIG. 11 is an isometric view of the tailgate and liner in accordance with the embodiment showing the relative location of screws ready for installation;

FIG. 11a is an enlargement of a portion of the tailgate liner as shown in FIG. 11 showing the arrangement of a screw used for installation of the pickup bed liner in accordance with the embodiment;

FIG. 13 is a schematic sectional rear perspective view of a pickup bed liner installed within a vehicle;

FIG. 13a is an enlarged sectional view of the upper left rim of the vehicle as shown in FIG. 13 showing the relative position of the pickup bed liner in accordance with the embodiment;

DETAILED DESCRIPTION OF A SPECIFIC EMBODIMENT

Figure 1:
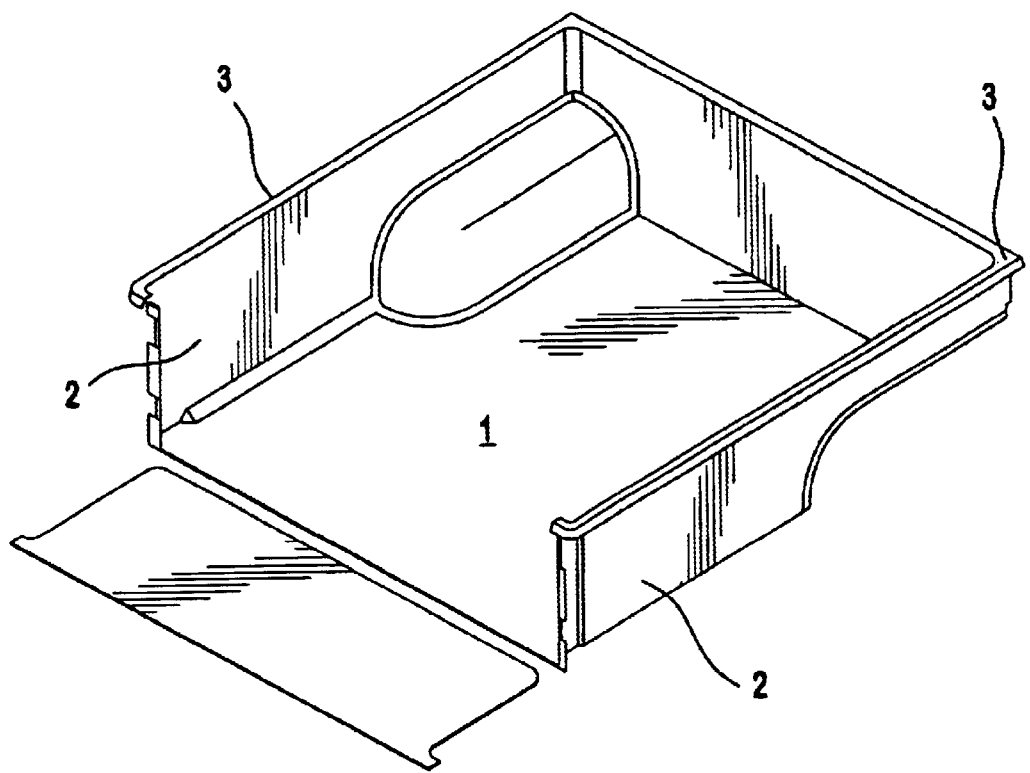
FIG. 1 is an isometric view of a pickup bed liner according to the prior art, the liner having an upper edge adapted to overlie the upper rim of a pickup bed.

A pickup bed liner is installed within a pickup bed to protect the pickup bed from damage and scratches caused by cargo placed within the pickup bed. FIG. 1 depicts an embodiment of a pickup bed liner in accordance with the prior art, the liner 1 having side walls 2 and upper edge portions 3 extending substantially transversely to the side walls 2 and adapted to overlie the upper rim of a pickup bed. Typically, such liners are secured to the pickup bed by screws passing through the edge portions 3 into holes drilled into the rim of the pickup bed.

Figure 2:
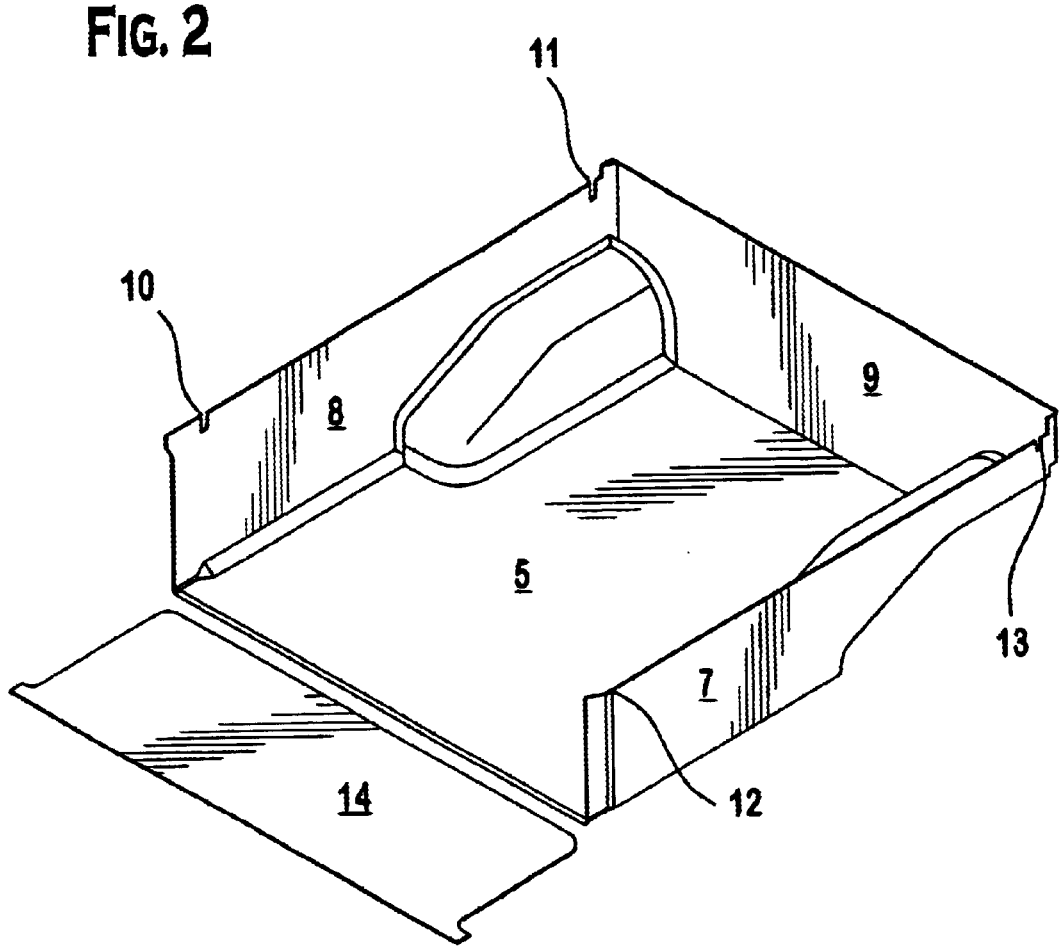
FIG. 2 is an isometric view of a pickup bed liner according to the embodiment.
Figure 3:
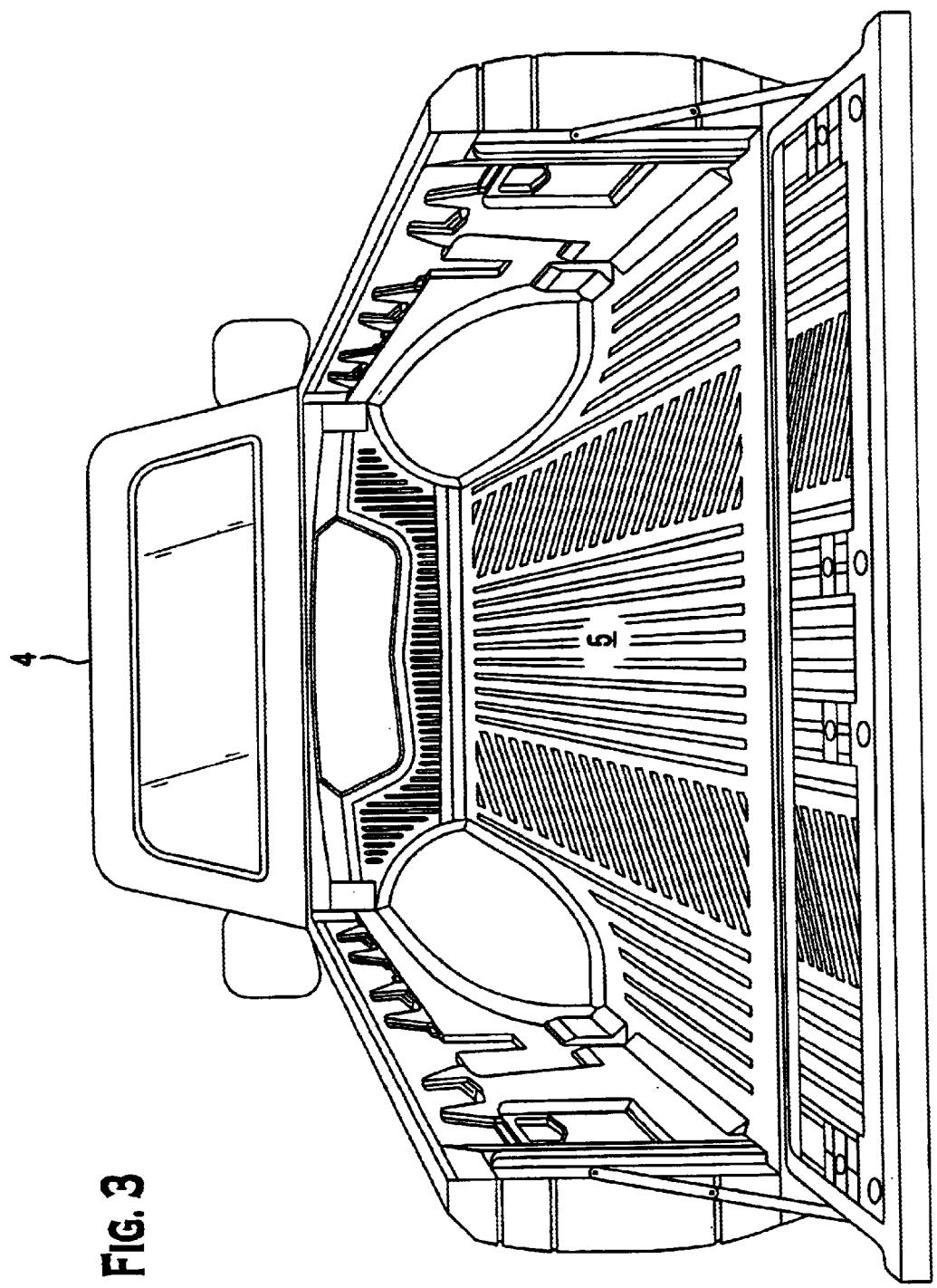
FIG. 3 is a rear perspective view of a pickup bed liner according to the embodiment, the liner being installed within a pickup.
Figure 4:
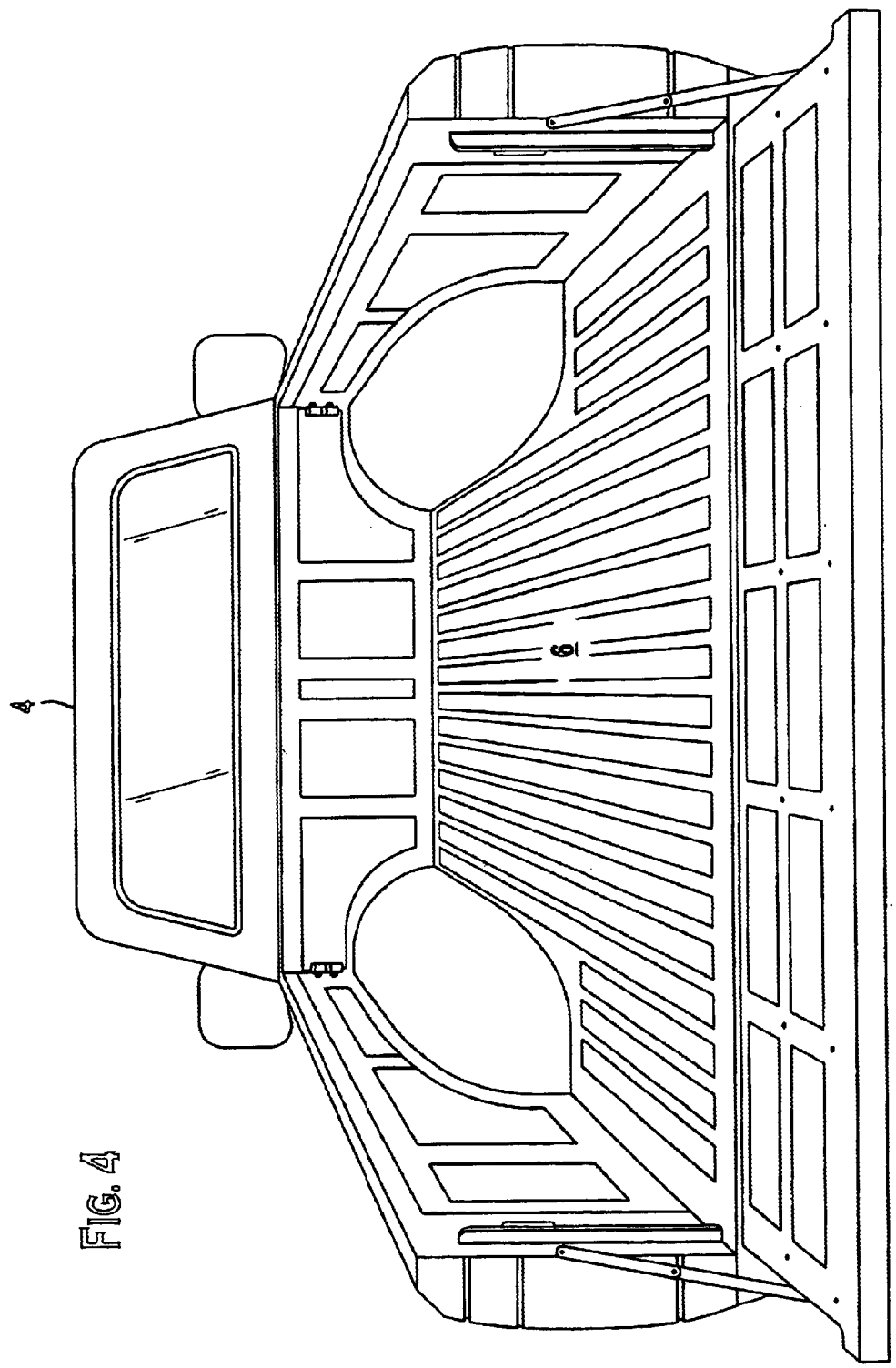
FIG. 4 is a rear perspective view of a pickup bed of a typical pickup to which the embodiment may be installed.

FIG. 2 depicts a pickup bed liner in accordance with the embodiment. The pickup bed liner comprises a main body 5 and a tailgate portion 14. The man body 5 comprises a base panel, a right side wall 7, a left side wall 8 and a front wall 9, each of the side walls 7 and 8 and the front wall 9 upstanding from the base panel. The pickup bed liner is manufactured from a durable and resiliently flexible material such as high density polythene. The exact configuration of the liner is adapted to the shape of the particular model of vehicle for which it is produced, and typically includes wheel arch portions at the lower front corners of the liner adapted to correspond with the wheel arches of the particular vehicle model.

The height of the upper edge of one side wall from the base panel is greater than height of the upper edge of the other side wall from the base panel. In the drawings, the left side wall 8 is shown at a greater height than the right side wall 7, although the alternative configuration is equally as suitable. Unlike the prior art, the upper edges of the side walls 7 and 8 comprise simple edges of the side walls and, as shown in FIGS. 13, 13a and 13b, the side portions 7 and 8 are adapted to be inserted beneath the upper rim 18 of the pickup bed between the outer panel 6 and the lip 17 of the upper rim of the outer side wall. The front wall 9 is slightly higher than the higher side wall and configured to abut the lip 17.

As shown in FIG. 2, the side walls 7 and 8 further comprise cut-outs in the form of front slits 13 and 11 respectively extending downwardly from the upper edges of the side walls adjacent to the front wall 9 and rear slits 12 and 10 respectively extending downwardly from the upper edge of the side portions adjacent the rear of the main body 5. The length of the each slit is greater than the width of the rim lip 17 below the rim 18 of the pickup bed. The width of each slit is not less than the thickness of the pickup bed liner. The slits are provided to enable the edges to be bent during installation to fit the liner into position in the pickup bed. The slits 10 and 12 are disposed from the rear of the liner sufficiently to provide strength when the portion of the upper edge between the slit and the rear is bent. Similarly, the slits 13 and 11 are disposed sufficiently from the front of the liner to provide strength but allow sufficient flexing of the material. Due to the resilience of the liner material, the edges of the side portions return to their original orientation after installation.

To install the pickup bed liner of the embodiment into a pickup bed, the method of installation described below may be followed.

Figure 7:
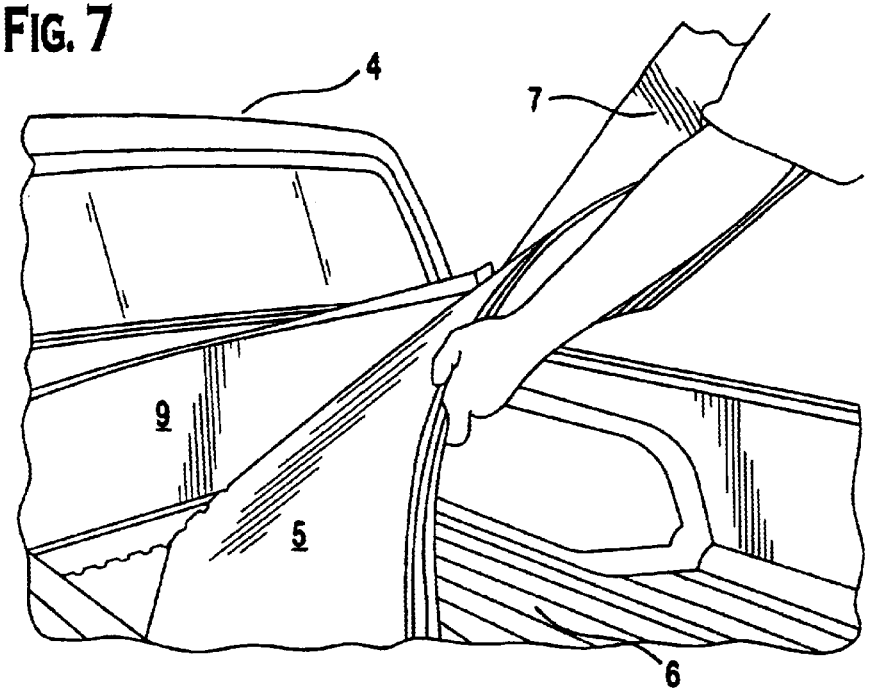
FIG. 7 is a diagrammatic view of a third step in the method of installation of the pickup bed liner according to the embodiment.
Figure 8:
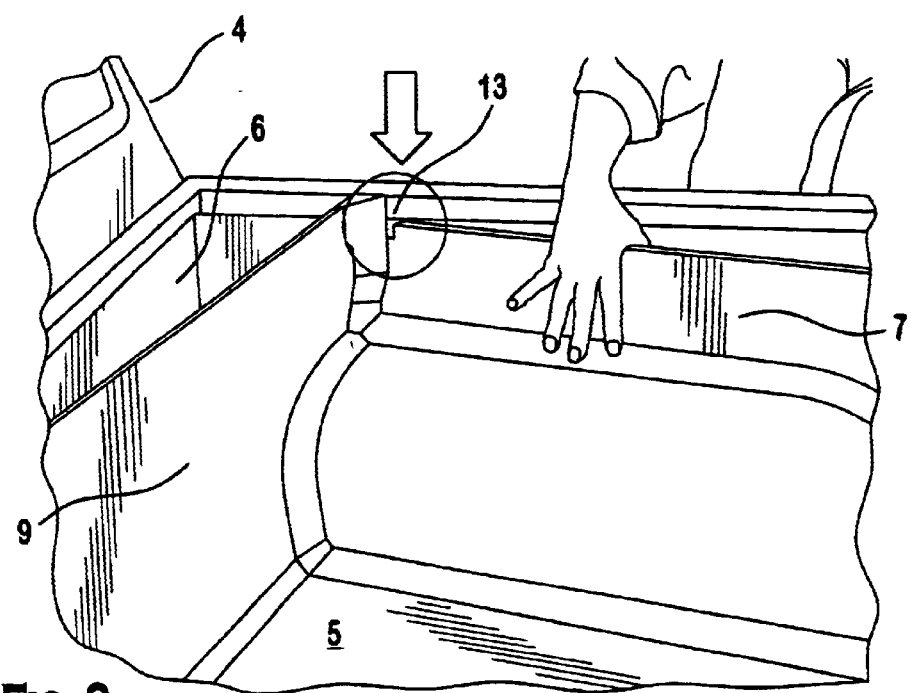
FIG. 8 is a diagrammatic view of a fourth step in the method of installation of the pickup bed liner according to the embodiment.
Figure 9:
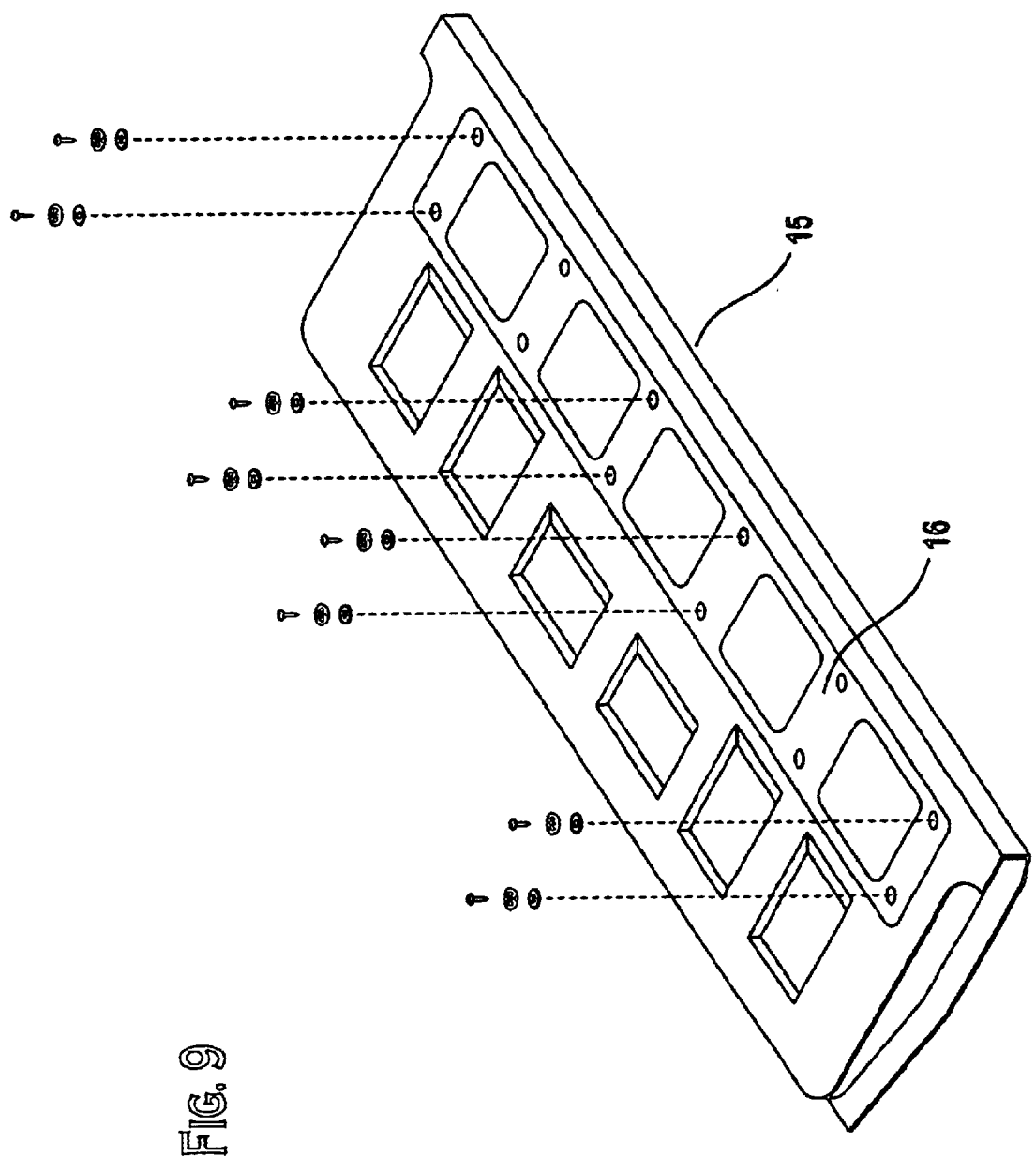
FIG. 9 is an isometric view of a tailgate showing the location of screws to be removed to permit the installation of a tailgate liner according to the embodiment.
Figure 12:
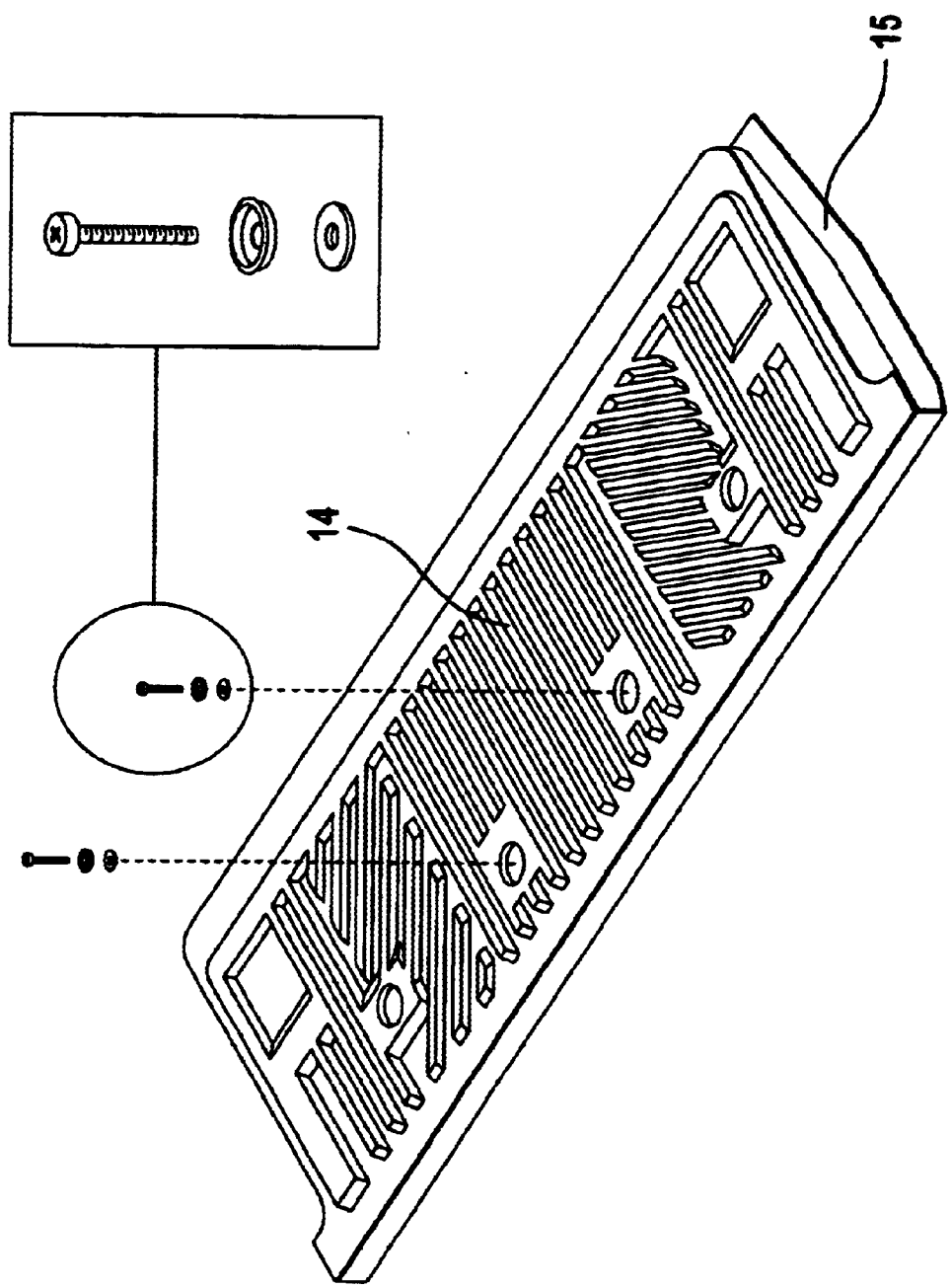
FIG. 12 is an isometric view of an alternative embodiment of a tailgate.

1. As shown in FIG. 5, after cleaning of the pickup bed, the liner is positioned within the pickup bed, held at an angle laterally to the pickup bed to enable the left edge, being the higher side edge in the drawings, to be aligned with the left rim of the pickup bed.
2. As shown in FIG. 6, the edge of the left side portion 8 between the slits 10 and 11 is inserted beneath the rim lip 17 and under the rim 18. The edge portion between the slit 10 and the rear of the liner is not positioned beneath the rim 18, thereby providing a clamping action to the lip 17 of the rim 18.
3. As shown in FIG. 6a, the edge portion between the slit 11 and the front portion 9 of the liner is not positioned under the rim 18, thereby providing a clamping action to the lip 17 of the rim 18.
4. As shown in FIG. 7, the liner is then manoeuvred to engage slit 13 with the lip 17 of the rim 18 of the right side portion 7.
5. Next, as shown in FIG. 8, the edge of the right side portion 7 between slits 13 and 12 is inserted beneath the lip 17 of rim 18.
6. Thereafter, slit 12 is positioned to engage the lip 17 of the rim 18 thereby locking the main body to the pickup bed.
7. Finally, as shown in FIGS. 9 to 11, the tailgate liner is installed to the tailgate 15 by removing the screws from the tailgate panel 16, positioning the tailgate liner 14 onto the tailgate panel 15 and inserting the screws to secure the tailgate liner in position.

By the use of this novel pickup bed liner, the time required to install the liner to the pickup bed is reduced significantly, as there is no need to drill holes in the pickup bed and insert screws. Because holes are not drilled in the pickup bed, these initial points of rusting are avoided. Further, a roof canopy may be closely mounted onto the pickup bed without the heads of support screws interfering with the sealing between the roof canopy and the pickup bed, sealant being applied directly between the rim 18 and the canopy.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A one piece bed liner formed by a polymer sheet, the one piece bed liner being adapted for insertion in a pickup bed, the pickup bed being defined by a bed floor and two bed side panels disposed on and generally perpendicular to the bed floor, an end of each of the two bed side panels, located opposite from the bed floor, being configured to form a bed side rail and an inner lip that extends generally toward the bed floor such that the bed side rail and the inner lip cooperate with the corresponding one of the two bed side panels to define a recess that opens toward the bed floor, the bed side rail being located at a first height from the bed floor as measured in a direction generally perpendicular to the bed floor, an edge of the inner lip closest to the bed floor being located at a second height as measured in a direction generally perpendicular to the bed floor, the one piece bed liner comprising:

a base panel;

first and second side panels disposed along generally opposite sides of the base panel, each of the first and second side panels include a portion configured to form a wheel arch, the first and second side panels each having a different height that is less than the first height and greater than the second height, as measured generally perpendicularly from the base panel, to facilitate installation of the one piece bed liner into the pickup bed;

a front panel disposed along the base panel and positioned between the first and second side panels;

the first side panel defining a slit, the slit being positioned along an edge of the first side panel opposite from the base panel, the length of the slit, as measured generally perpendicular to the base panel, is greater than a length of the inner lip as measured in a direction generally parallel to the front panel, the width of the slit, as measured generally parallel to the base panel, being larger than the thickness of the polymer sheet; and wherein the one piece bed liner is adapted to apply a clamping force on the pickup bed when the one piece bed liner is installed therein with a portion of the inner lip being positioned in the slit and a portion of the first side panel being located in the recess such that a resilient nature of the polymer sheet causes the first panel to clamp the inner lip between the portion of the first panel in the recess and another portion of the first panel abutting the inner lip and located outside of the recess.

2. The one piece bed liner of claim 1, wherein the first panel defines a second slit disposed on the edge of the first panel and spaced from the slit.

3. The one piece bed liner of claim 2, wherein the second panel defines a third slit positioned along a second panel edge opposite from the base panel.

* * * * *

UNITED STATES PATENT AND TRADEMARK OFFICE
CERTIFICATE OF CORRECTION

PATENT NO. : 6,692,054 B2
DATED : February 17, 2004
INVENTOR(S) : Pawat Vitoorapakorn Page 1 of 1

It is certified that error appears in the above-identified patent and that said Letters Patent is hereby corrected as shown below:

<u>Column 1,</u>
Line 25, delete "pick", and insert therefor -- pickup --.

<u>Column 3,</u>
Line 11, delete "man", and insert therefor -- main --.
Line 28, delete "and 13b".

Signed and Sealed this

Twenty-ninth Day of June, 2004

JON W. DUDAS
*Acting Director of the United States Patent and Trademark Office*